(12) United States Patent
Ueno et al.

(10) Patent No.: US 6,557,722 B2
(45) Date of Patent: May 6, 2003

(54) CASE CONNECTION STRUCTURE

(75) Inventors: Yoshihisa Ueno, Okazaki (JP); Masaei Mitomi, Okazaki (JP); Hideaki Inazawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/996,336

(22) Filed: Nov. 28, 2001

(65) Prior Publication Data

US 2002/0070216 A1 Jun. 13, 2002

(30) Foreign Application Priority Data

Dec. 8, 2000 (JP) .................................. 2000-374291

(51) Int. Cl.7 .............................................. B65D 43/12
(52) U.S. Cl. ..................................................... 220/796
(58) Field of Search .................................. 220/796, 4.21

(56) References Cited

U.S. PATENT DOCUMENTS 4,466,585 A * 8/1984 Maehara ..................... 206/391

FOREIGN PATENT DOCUMENTS

| EP | 0 735 286 | 10/1996 |
|---|---|---|
| GB | 1009174 | 11/1965 |
| JP | A52-127510 | 10/1977 |
| JP | U63-137979 | 9/1988 |
| JP | A11-91812 | 4/1999 |

OTHER PUBLICATIONS

Journal of Nippondenso Technical Disclosure, Jan. 1996.

* cited by examiner

*Primary Examiner*—Stephen Castellano
(74) *Attorney, Agent, or Firm*—Harness, Dickey & Pierce, P.L.C.

(57) ABSTRACT

In a case connection structure for connecting connection end portions of both case members, a boss portion is formed in one of the connection end portions to protrude to the other one of the connection end portions, and a recess portion into which the boss portion is fitted is formed in the other one of the connection end portions. A slit is provided in the boss portion, and a press-fitting portion is provided in the recess portion to be press-fitted into the slit. While the boss portion is fitted into the recess portion, the press-fitting portion is press-fitted into the slit to expand the boss portion to an outer side, so that an outer surface of the boss portion press-contacts the recess portion.

12 Claims, 5 Drawing Sheets

CASE CONNECTION STRUCTURE

CROSS-REFERENCE TO RELATED APPLICATION

This application is related to Japanese Patent Application No. 2000-374291 filed on Dec. 8, 2000, the contents of which are hereby incorporated by reference.

BACKGROUND OF THE INVENTION

1. Field of the Invention

The present invention relates to a case connection structure for integrally connecting plural division case members. The case connection structure is suitably used for a case of vehicle air conditioner.

2. Description of Related Art

In a conventional vehicle air conditioner, plural division case members are separately formed by resin, and are integrally connected for constructing a case of a cooler unit, a heater unit or a blower unit. However, because air-conditioning components are disposed within the division case members, the connection operation becomes difficult. For example, for accommodating an air mixing door, a heater core and mode switching doors in the heater unit case (the case of the heater unit), an assembling operation of the heater unit case is divided into a first assembling step and a second assembling step, and the first assembling step and the second assembling step are independently performed using suitable methods and equipments, respectively. When the heater unit case is divided into both upper and lower division case members for accommodating the air-conditioning components, it is necessary to temporally assemble both the division case members in the first assembling step by using screw members after the components are accommodated in the division case members. When both the division case members are not temporally connected in the first assembling step, a connection between both the division case members is removed while the temporally assembled body is moved to a place where the second assembling step is performed, and a regular assembling position of the air-conditioning components may be shifted.

SUMMARY OF THE INVENTION

In view of the foregoing problems, it is an object of the present invention to provide a case connection structure in which an assembling state between both division case members can be held without a fastening operation such as a screw fastening connection and a spring clip connection.

According to the present invention, in a case connection structure for connecting a first case member having a first connection end portion and a second case member having a second connection end portion corresponding to the first connection end portion of the first case member in a connection direction, a boss portion is provided to protrude from one of the first and second connection end portions toward the other one of first and second connection end portions in the connection direction, and a recess portion is provided in the other one of the first and second connection end portions. By fitting the boss portion into the recess portion, a fixing position of both the connection end portions of the first and second case members can be performed. In the case connection structure, a press-fitting portion is provided in the recess portion, and a slit is provided in the boss portion. When both the first and second case members are connected in the connection direction, the boss portion is fitted into the recess portion, and the press-fitting portion is press-fitted into the slit to press-expand the boss portion to an outer side, in such a manner that an outer wall surface of the boss portion press-contacts an inner wall surface of the recess portion. Accordingly, a friction force is applied between an outer wall surface of the boss portion and the inner wall surface of the recess portion, and an assembling state between both the first and second division case members can be held without performing a fastening operation such as a screw fastening connection or a spring clip connection.

Preferably, the press-fitting portion has a taper portion for increasing a press-expanding amount of the boss portion to the outer side, and the press-fitting portion is tapered toward the boss portion. Therefore, even when the dimension difference of the boss portion is caused in a manufacturing step, the outer surface of the boss portion can accurately press-contact the inner wall surface of the recess portion. Accordingly, a sufficient friction force can be obtained between the outer wall surface of the boss portion and the inner wall surface of the recess portion, even when the dimension difference of the boss portion or the recess portion is caused in the case members.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In this embodiment, a case connection structure of the preset invention is typically used for a heater unit of a vehicle air conditioner. Arrangement directions of the heater unit 10 on a vehicle correspond to that in FIG. 1 in an up-down direction, a front-rear direction and a right-left direction.

Figure 1:
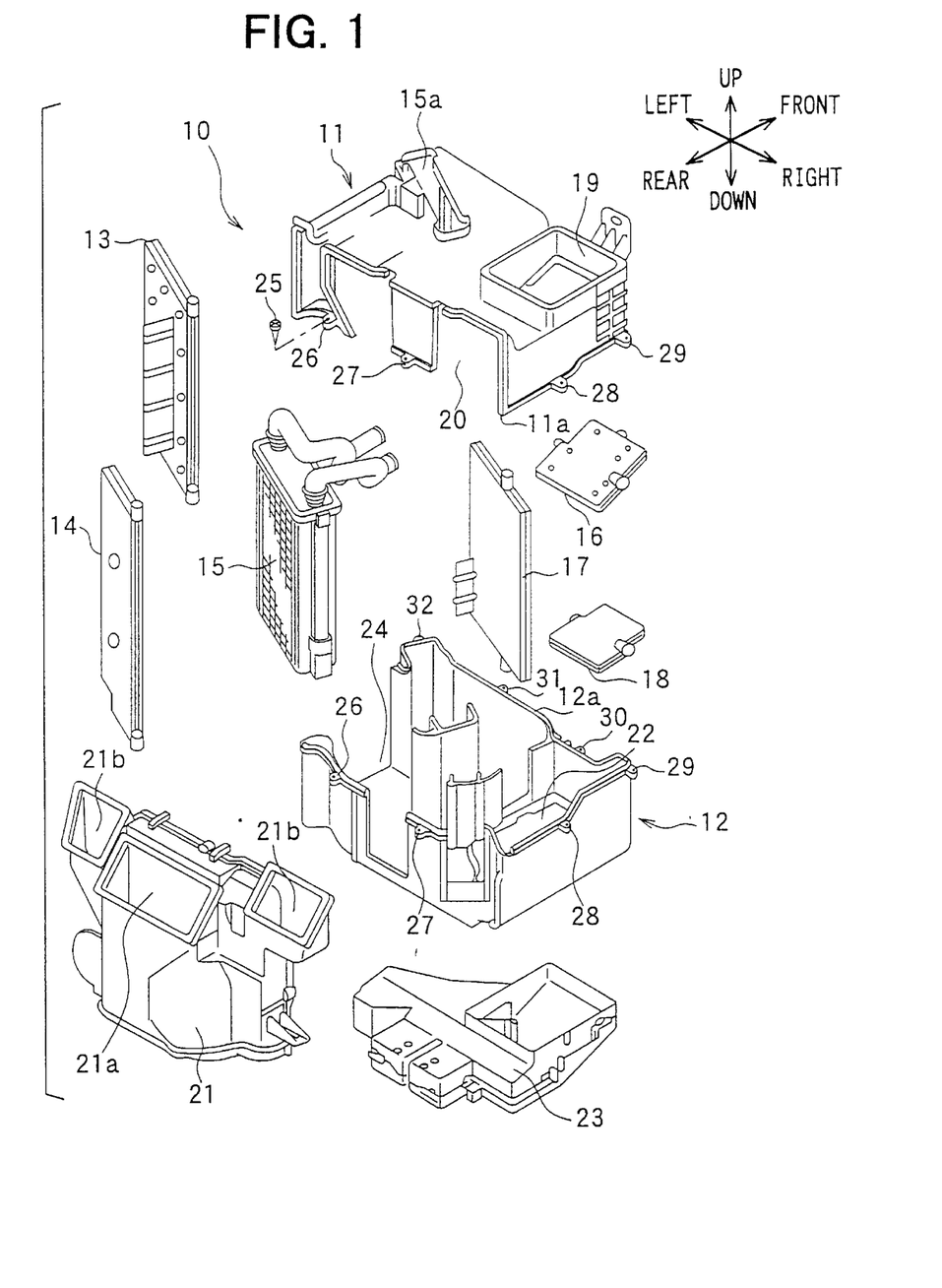
FIG. 1 is a disassembled perspective view of a heater unit of a vehicle air conditioner according to a preferred embodiment of the present invention.

The heater unit 10 includes a case for defining an air passage and for accommodating air-conditioning components. The case of the heater unit 10 is constructed by upper and lower division case members 11, 12. Each of the division case members 11, 12 is made of a resinous material having a sufficient strength and a suitable elasticity, such as polypropylen, and is formed into an approximate U-shaped cross-section. The division case members 11, 12 have connection end portions 11a, 12a on the end portion of the U-shaped cross-section.

Within a space defined by both the division case members 11, 12, two operatively-linked air mixing doors 13, 14, a heater core (heating heat exchanger) 15, a defroster door, a face door 17, a foot door 18 and the like are disposed. The air mixing doors 13, 14 are disposed to adjust temperature of air blown into a passenger compartment, and the heater core 15 is disposed to heat air passing therethrough. Further, the defroster door 16, the face door 17 and the foot door 18 construct a mode switching member for switching an air outlet mode.

On upper surface part of the upper division case member 11, a heater core insertion port 15a and a defroster opening 19 opened and closed by the defroster door 16 are opened. An opening 20 is opened in a rear side part of the upper division case member 11, and the upper division case member 11 is connected to a three-way branch box 21 at the opening 20. A center face opening 21a and both left and right side face openings 21b are provided in the three-way branch box.

A foot opening 22 is opened in the lower division case member 12 to be opened and closed by the foot door 18. A foot duct 23 is connected to the lower division case member 12 at the foot opening 22. An air inlet port 24 from which air from a blower unit and a cooling unit flows into the heater unit 10 is provided in left side portions (front passenger's seat side) of the upper and lower division case members 11, 12.

Figure 2:
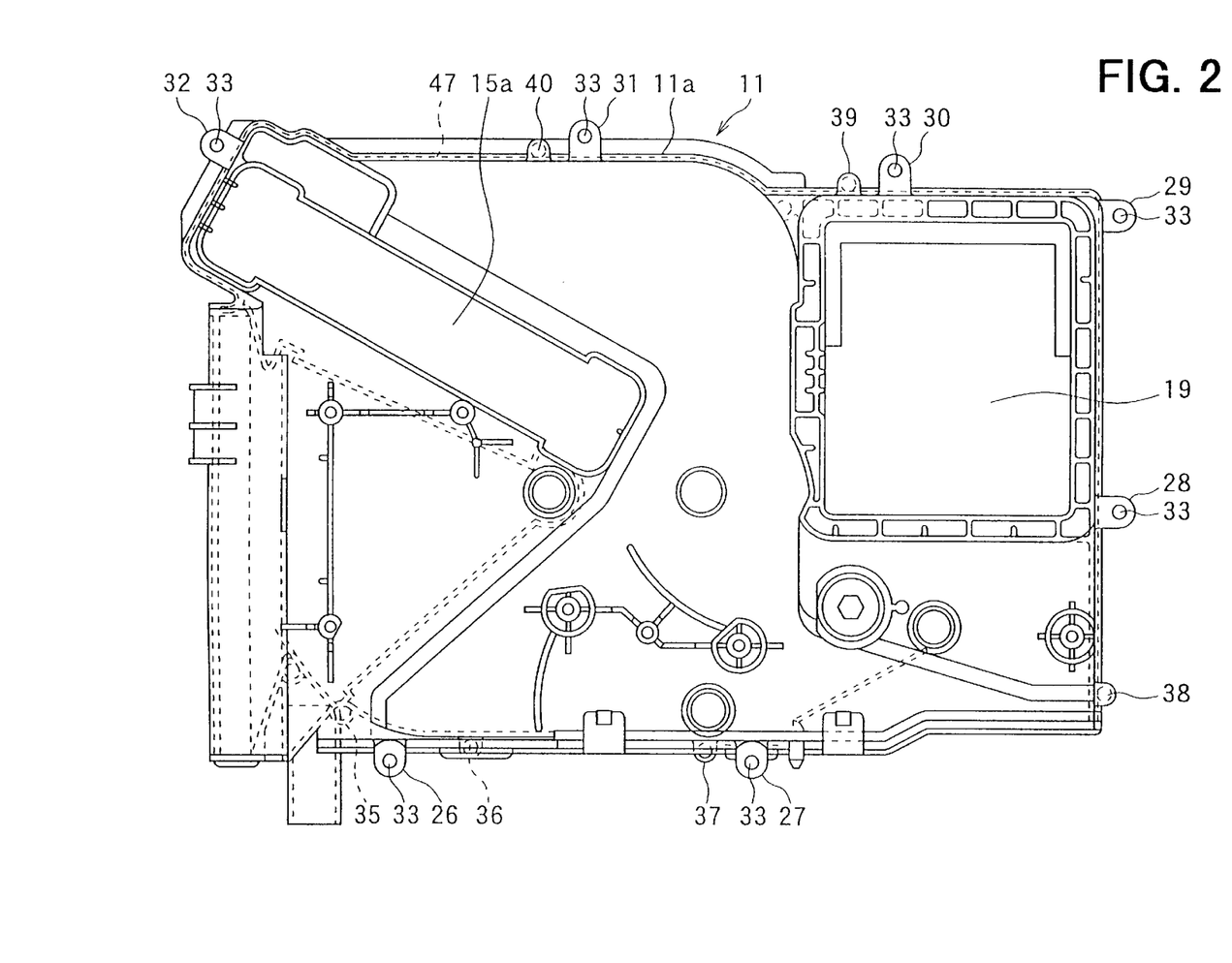
FIG. 2 is a top view of an upper division case member of the heater unit in FIG. 1.
Figure 3:
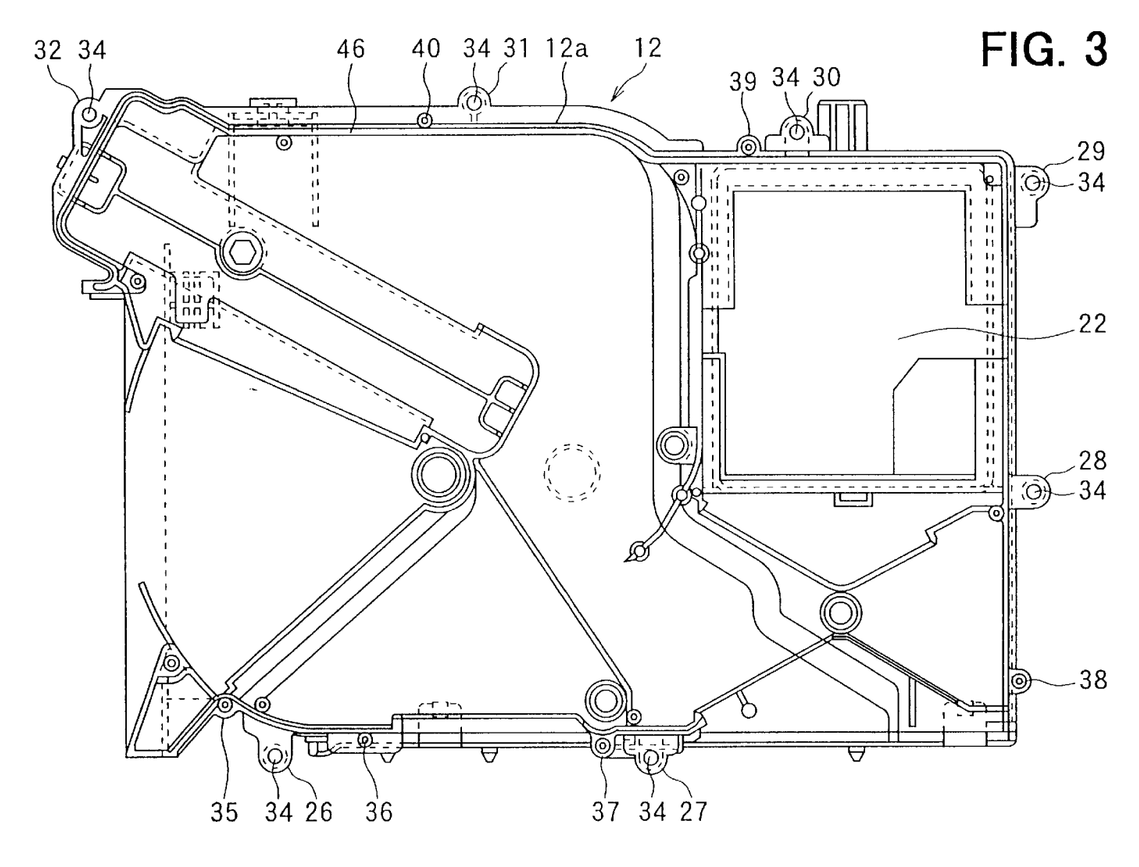
FIG. 3 is a top view of a lower division case member of the heater unit in FIG. 1.

FIG. 2 is a top view of the upper division case member 11, and FIG. 3 is a top view of the lower division case member 12. As shown in FIGS. 2 and 3, screw connection portions 26–32 are provided in the connection end portions 11a, 12a of the division case members 11, 12 by at plural positions (e.g., seven positions in this embodiment), and are connected using vises (screws) 25 (see FIG. 1). The screw connection portions 26–32 are formed to protrude from the connection end portions 11a, 12a of the division case members 11, 12 to an outer side, respectively. Attachment holes 33 are provided in the screw connection portions 26–32 of the upper division case member 11, and attachment holes 34 are provided in the screw connection portions 26–32 of the lower division case member 12. The attachment holes 34 of the lower division case member 12 are holes into which the screws 25 are screwed and are fastened. The division case members 11, 12 can be fastened and fixed at the screw connection portions 26–32 by screwing the screws 25 into the attachment holes 33, 34.

In the connection end portions 11a, 12a of the division case members 11, 12, position-determination fitting portions 35–40 are provided at plural positions (e.g., six positions) in addition to the screw connection portions 26–32. The position-determination fitting portions 35–40 are provided for performing a position determination of fitting position, when the connection end portions 11a, 12a of the division case members 11, 12 are fitted and assembled.

FIGS. 4A–6 show specific examples of the position-determination fitting portions 35–40. A cylindrical boss portion 42 is formed in one of the upper and lower division case members 11, 12. For example, in this embodiment, the cylindrical boss portion 42 is integrally formed with the connection end portion 12a of the lower division case member 12 to protrude from the connection end portion 12a toward the connection end portion 11a of the upper division case member 11.

Figure 4A:
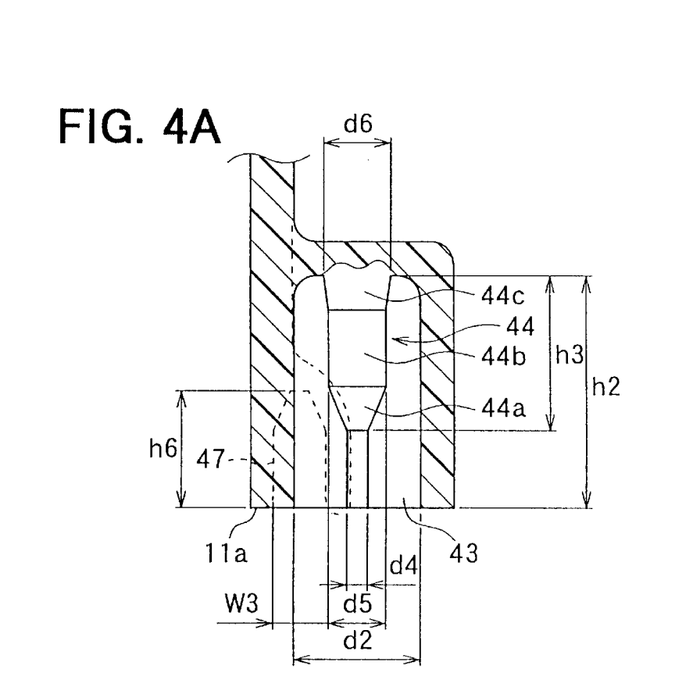
FIGS. 4A and 4B are a sectional view and a top view, respectively, showing a fitting-position determination portion of the upper division case member, according to the first embodiment.
Figure 4B:
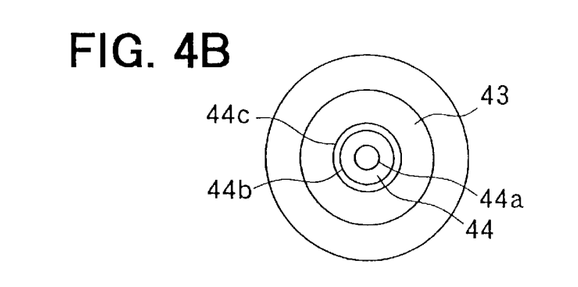
Figure 5A:
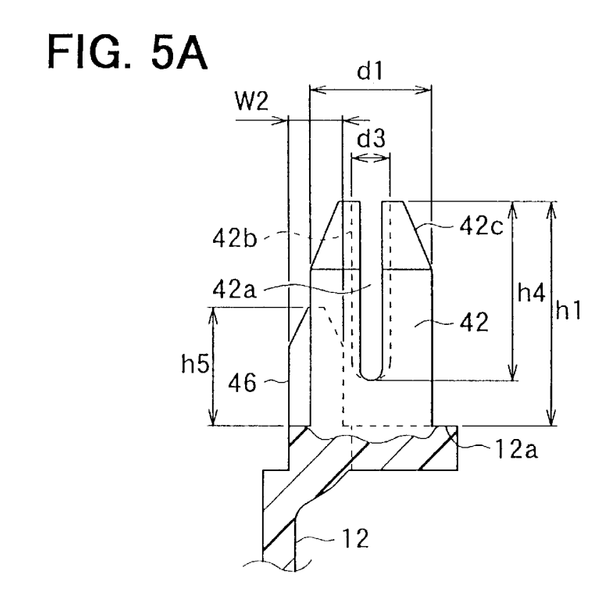
FIGS. 5A and 5B are a sectional view and a top view, respectively, showing a fitting-position determination portion of the lower division case member, according to the first embodiment.

On the other hand, a circular recess portion 43, into which the boss portion 42 is inserted to be fitted, is provided in the connection end portion 11a of the upper division case member 11. Here, an outer diameter d1 of the boss portion 42 is, for example, 5.6 mm, and an inner diameter d2 of the circular recess portion 43 is, for example, 5.8 mm. That is, the inner diameter d2 of the circular recess portion 43 is set to be slightly larger than the outer diameter d1 of the boss portion 42. Further, a height h1 (e.g., 10 mm) of the boss portion 42 is set to be sightly smaller than that of a depth h2 (e.g., 10.5 mm) of the recess portion 43.

Figure 5B:
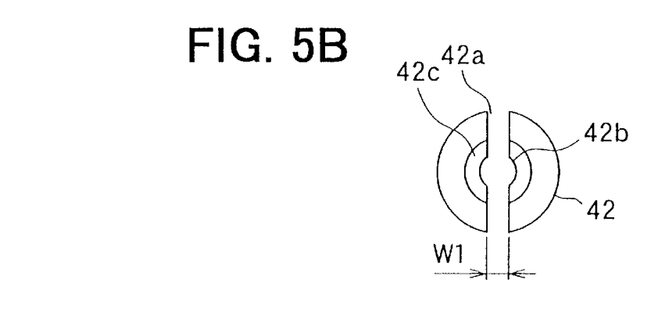

A slit 42a passing through a center of the boss portion 42 is formed in the boss portion 42 to extend in an axial direction (connection direction) of the cylindrical boss portion 42 from a top portion of the boss portion 42 toward a base portion thereof. A width dimension W1 of the slit 42a is 1 mm, for example. The slit 42a is provided to extend linearly in the axial direction (up-down direction) while having a predetermined width dimension W1. A circular portion 42b having a radial dimension d3 (e.g., diameter of 1.8 mm) larger than the width W1 of the slit 42a is formed at the center portion of the slit 42a in a diameter direction of the boss portion 42. A taper portion 42c having a tapered shape is formed at a top end portion of the boss portion 42.

On the other hand, a press-fitting portion 44 is integrally molded in the recess portion 43 to be press-fitted into the slit 42a when both the division case members 11, 12 are fitted and assembled. The press-fitting portion 44 is formed into an approximate cylindrical shape protruding from a center bottom portion of the recess portion 43 toward the boss portion 42. A height h3 of the press-fitting portion 44 is 7 mm, for example. The height h3 of the press-fitting portion 44 is set to be slightly smaller than the height h4 (e.g., 8 mm) of the slit 42a.

The press-fitting portion 44 can be divided into three parts in the axial direction. That is, a top taper portion 44a is formed at a top end portion of the press-fitting portion 44, and a top end diameter d4 of the taper portion 44a is set at a dimension (e.g., 1 mm) smaller than the diameter d3 of the center circular portion 42b of the slit 42a, so that the top taper portion 44a of the press-fitting portion 44 can be readily inserted into the slit 42a.

In the press-fitting portion 44, a body portion 44b having a certain cylindrical shape is formed at an upper side of the top taper portion 44a. The body portion 44b has a certain outer diameter d5 of 2.5 mm, for example. The outer diameter d5 of the body portion 44b is set to be larger than the diameter d3 of the center circular portion 42b of the slit 42a. Therefore, when the body portion 44b is press-fitted into the slit 42a of boss portion 42, the boss portion 42 can be expanded radial outside.

A base tapper portion 44c is formed at a base side of press-fitting portion 44 to extend from the body portion 44b.

An outer diameter of the base taper portion 44c gradually becomes larger toward the bottom side of the recess portion 43 from the body portion 44b. A maximum outer diameter (an outer diameter of the base portion) d6 is 3 mm, for example. Even when the dimension difference of the outer diameter of the boss portion 42 is caused, because the base taper portion 44c is formed, the boss portion 42 can be sufficiently expanded to be tightly pressed to the inner wall surface of the recess portion 43.

Figure 6:
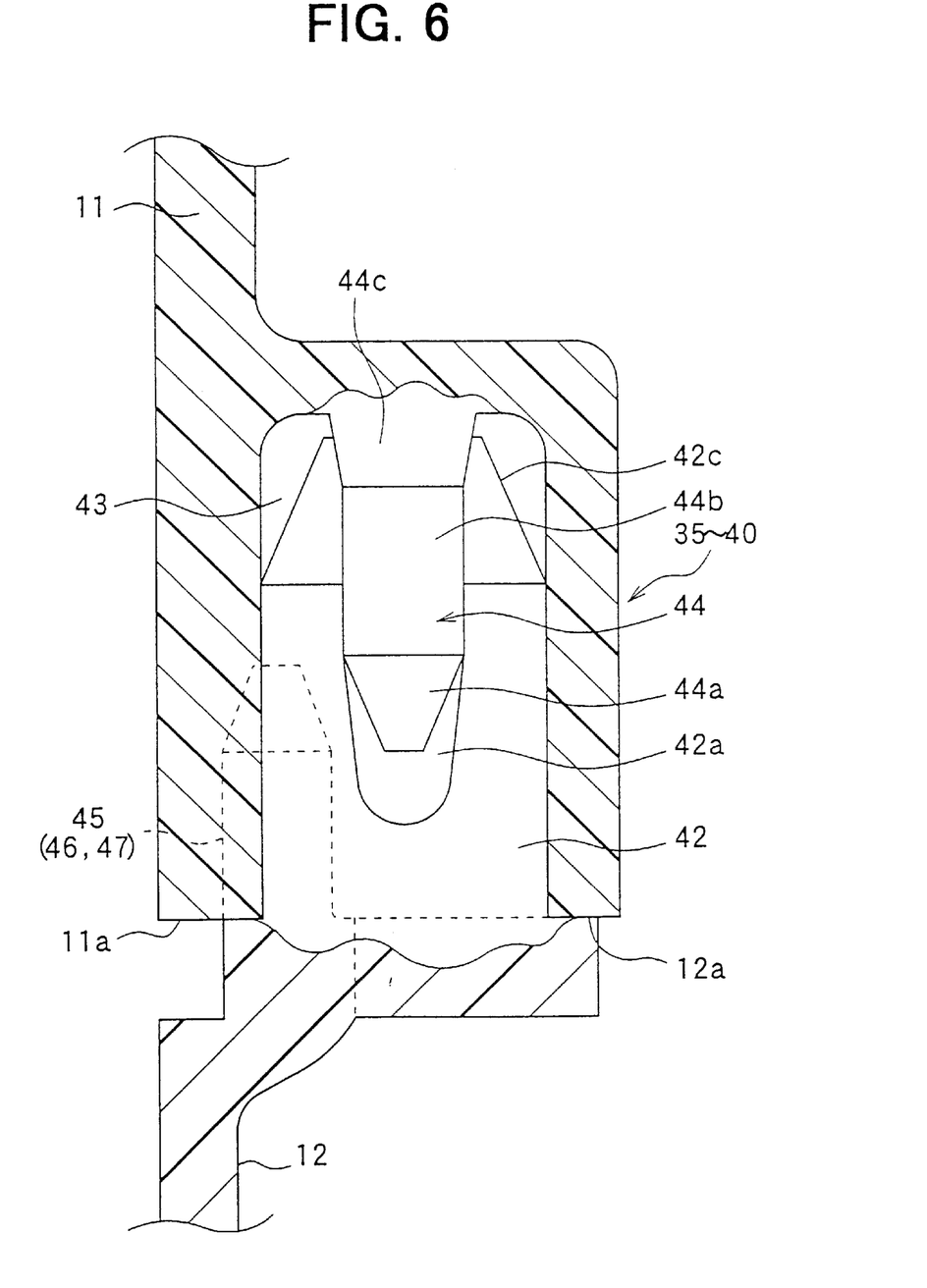
FIG. 6 is a sectional view showing a connection structure after the fitting-position determination portions shown in FIGS. 4 and 5 are assembled.

Belt-like engagement portions 45 are provided in both the connection end portions 11a, 12a as shown in FIG. 6, so that sealing performance between both the connection end portions 11a, 12a of the division case members 11, 12 can be improved. The engagement portions 45 are formed to extend in a belt like along an entire length of a sealing portion of the connection end portions 11a, 12a. Specifically, as shown in FIG. 5A, a belt-like protrusion 46 is formed in the connection end portion 12a having the boss portion 42, to protrude toward the connection end portion 11a. On the other hand, as shown in FIG. 4A, a belt-like recess 47 is formed in the connection end portion 11a having the recess portion 43, so that the belt-like protrusion 46 is fitted into the belt-like recess 47.

As shown in FIG. 5A, a width W2 of the belt-like protrusion 46 is made smaller than the diameter d1 of the boss portion 42, as shown in FIG. 5A. Further, the height h5 of the belt-like protrusion 46 is made lower than the height h1 of the boss portion 42. Accordingly, the depth h6 and the width W3 of the belt-like recess 47 are smaller than the depth h2 and the inner diameter d2 of the recess portion 43, respectively.

Next, an assembling method of the heater unit 10 will be now described. First, a temporary assembling step (first assembling step) will be now described.

In the first assembling step, the air-conditioning components such as the air mixing doors 13, 14 and the face door 17 are disposed in the lower division case member 12, and thereafter, the connection end portion 12a of the lower division case member 12 and the connection end portion 11a of the division case member 11 are disposed opposite to each other, and are fitted to be temporarily assembled.

Specifically, while both the connection end portions 11a, 12a of both the division case members 11, 12 are made close to each other, the top taper portion 42c of the boss portion 42 of the lower division case member 12 is inserted into the recess portion 43 of the upper division case member 11 in each of the position-determination fitting portions 35–40. Thereafter, when both the connection end portions 11a, 12a of the division case members 11, 12 are further proximate to each other, the top taper portion 44a of the press-fitting portion 44 within the recess portion 43 is inserted into the circular portion 42b of the slit 42a, and the body portion 44b of the press-fitting portion 44 is further inserted into the circular portion 42b of the slit 42a.

Because the outer diameter d5 of the body portion 44b is larger than the inner diameter d3 of the circular portion 42b, the body portion 44b of the press-fitting portion 44 is press-fitted into the circular portion 42b of the slit 42a. Therefore, both division portions of the boss portion 42 separated by the slit 42a press-expend to a radial outer side, so that the outer wall surface of the boss portion 42 press-contacts the inner wall surface of the recess portion 43. In addition, the base taper portion 44c of the press-fitting portion 44 further facilitates the press-expansion of the boss portion 42 to the radial outer side, and the outer wall surface of the boss portion 42 can accurately press-contact the inner wall surface of the recess portion 43 even when the outer radial dimension of the boss portion 42 has the dimension different in a manufacturing step.

Because the assembling positions of both the connection end portions 11a, 12a are determined by the engagement between the boss portion 42 and recess portion 43, the insertion of the belt-like protrusion 46 into the belt-like recess 47 is started while both the connection end portions 11a, 12a are made proximate to each other, and the insertion of the belt-like protrusion 46 into the belt-like recess 47 is finished in a state where both the connection end portions 11a, 12a contact as shown in FIG. 6.

When both the division case members 11, 12 contact, the press-fitting portion 44 is press-fitted into the slit 42a of the boss portion 42, and the boss portion 42 press-expands to the radial outer side so that the outer wall surface of the boss portion 42 press-contacts the inner wall surface of the recess portion 43. Therefore, the friction force is generated between the boss portion 42 and the recess portion 43, and the boss portion 42 is tightly held in the recess portion 43 by the friction force. Accordingly, both the division case members 11, 12 can be temporality fixed without performing a fastening operation in the screw connection portions 26–32. After the temporarily fixing operation of both the division case members 11, 12 is finished, the first assembling step (temporary assembling step) can be finished. Thereafter, the temporary assembled body is moved to a position where the second assembling step (final assembling step) is performed.

In the second assembling step, the defroster door 16 is assembled from the defroster opening 19 into the temporary assembled body, and the foot door 18 is assembled from the foot opening 22 into the temporary assembled body, respectively. In addition, the heater core 15 is assembled into the temporary assembled body from the heater-core insertion port 15, and components such as the three-way branch box 21 and the foot duct 23 are assembled to an outer surface side of the temporary assembled body. Thereafter, both the division case members 11, 12 are fastened in the screw connection portions 26–32, using the screws 25. Accordingly, the fastening operation of the screws 25 can be performed together in the second assembling step. Here, the fastening operation of the screws 25 can be performed by a robot operation.

In this embodiment, because the holding force can be obtained by the friction force between the boss portion 42 and the recess portion 43 in the temporarily fixed state of both the division case members 11, 12, the number of the screw connection portion can be reduced, and case connection structure of both the division case members 11, 12 can be made simple.

Although the present invention has been fully described in connection with the preferred embodiment thereof with reference to the accompanying drawings, it is to be noted that various changes and modifications will become apparent to those skilled in the art.

For example, in the above-described embodiment of the present invention, both the division case members 11, 12 are integrally connected and fastened using the screws 25. However, both the division case members 11, 12 can be integrally connected by a C-shaped spring clip. In this case, the C-shaped spring clip is attached to a protrusion portion of the connection end portions 11a, 12a, so that an elastic force of the spring clip is applied to press fix both the connection end portions 11a, 12a.

In the above-described embodiment, the press-fitting portion 44 is formed into the approximate cylindrical shape (cylindrical pillar shape). However, the press-fitting portion can be formed into an elliptic shape in cross-section, or a flat plate.

In the above-described embodiment, the present invention is typically applied to the case connection structure of both the division case members 11, 12 of the heater unit 10 for the vehicle air conditioner. However, the present invention can be applied to a case connection structure of division case members of the cooler unit or a blower unit of the vehicle air conditioner, for example.

The case connection structure of the present invention can be also applied to a duct only for defining an air passage and without having a component. In this case, because both division case members of the duct can be connected using a small connection force (assembling holding force), the connection portions 26–32 using the screws 25 or the connection portions using the C-shaped clip can be omitted. That is, by press-fitting the press-fitting portion 44 of the recess portion 43 into the slit 42 of the boss portion 42, both the division case members of the duct can be sufficiently tightly connected. Accordingly, the connection structure of both the division case members of the duct can be made simple.

Such changes and modifications are to be understood as being within the scope of the present invention as defined by the appended claims.

What is claimed is:

1. A case connection structure for connecting a first case member having a first connection end portion and a second case member having a second connection end portion corresponding to the first connection end portion of the first case member in a connection direction, the case connection structure comprising:
    a boss portion provided to protrude from one of the first and second connection end portions toward the other one of first and second connection end portions in the connection direction, the boss portion having a slit;
    a recess portion provided in the other one of the first and second connection end portions into which the boss portion is fitted; and
    a press-fitting portion provided in the recess portion; wherein,
    when both the first and second case members are connected in the connection direction, the boss portion is fitted into the recess portion and the press-fitting portion is press-fitted into the slit to press-expand the boss portion to an outer side in such a manner that an outer wall surface of the boss portion press-contacts an inner wall surface of the recess portion; and
    the press-fitting portion includes a body portion having a cylindrical shape extending in the connection direction; and
    an outer peripheral wall of the body portion press-contacts an inner wall surface of the boss portion defining the slit to generate a friction force in the connection direction when the press-fitting portion is press-fitted into the slit.

2. The case connection structure according to claim 1, wherein the press-fitting portion further includes a taper portion for increasing a press-expanding amount of the boss portion to the outer side, the taper portion being integrated with one axial end of the body portion to be tapered toward a radial outside from the one axial end of the body portion.

3. The case connection structure according to claim 2, wherein:
    the press-fitting portion is disposed to protrude from a bottom surface of the recess portion to have a base portion on the bottom surface;
    the taper portion is provided on the base portion to be integrated with the body portion; and
    the press-fitting portion has a top taper portion at the other axial end of the body portion, the top taper portion having a radial dimension smaller than that of the taper portion on the base portion.

4. The case connection structure according to claim 1, wherein:
    the press-fitting portion is disposed to protrude from a bottom surface of the recess portion to have a base side on the bottom surface and a protrusion top side; and
    the taper portion is provided at both the base side and the protrusion top side in the press-fitting portion.

5. The case connection structure according to claim 1, further comprising
    a connection member for integrally connecting both the first and second case members after the boss portion is fitted into the recess portion.

6. The case connection structure according to claim 5, wherein the connection member is a screw member.

7. The case connection structure according to claim 1, wherein:
    the boss portion has an approximate cylindrical shape;
    the slit is provided to penetrate through a center portion of the approximate cylindrical shape and to extend in the connection direction;
    the slit has a circular portion at the center portion; and
    the body portion is press-fitted into the circular portion.

8. The case connection structure according to claim 7, wherein the press-fitting portion has a taper portion at a base portion of the body portion, for increasing a press-expanding amount of the boss portion.

9. The case connection structure according to claim 1, wherein:
    the boss portion is molded integrally with one of the first and second case members using a resin; and
    the recess portion and the press-fitting portion are molded integrally with the other one of the first and second case members using a resin.

10. The case connection structure according to claim 1, wherein:
    the boss portion has an approximate cylindrical shape;
    the slit is provided to extend in the connection direction by a predetermined dimension and to division the boss portion into two parts in the predetermined dimension; and
    the press-fitting portion is press-fitted into the slit to increase a press-expansion amount of the boss portion in a direction perpendicular to the connection direction.

11. A case connection structure for connecting a first case member having a first connection end portion and a second case member having a second connection end portion corresponding to the first connection end portion of the first case member in a connection direction, the case connection structure comprising:
    a boss portion provided to protrude from one of the first and second connection end portions toward the other one of first and second connection end portions in the connection direction, the boss portion having a slit;
    a recess portion provided in the other one of the first and second connection end portions, into which the boss portion is fitted; and
    a press-fitting portion provided in the recess portion, wherein,
    when both the first and second case members are connected in the connection direction, the boss portion is fitted into the recess portion, and the press-fitting portion is press-fitted into the slit to press-expand the boss portion to an outer side, in such a manner that an outer wall surface of the boss portion press-contacts an inner wall surface of the recess portion;
    the boss portion has an approximate cylindrical shape;
    the slit is provided to extend in the connection direction by a predetermined dimension and to division the boss portion into two parts in the predetermined dimension; and
    the press-fitting portion is press-fitted into the slit to increase a press-expansion amount of the boss portion in a direction perpendicular to the connection direction;

the slit has a circular recess recessed to a radial outer side at a center portion of the approximate cylindrical shape; and the press-fitting portion is press-fitted into the circular recess.

12. The case connection structure according to claim 11, wherein:

the press-fitting portion has a top taper portion tapered toward a top end of the press-fitting portion, a body portion extending from the top taper portion to have a certain radial dimension, and a base taper portion tapered from a base portion of the press-fitting portion to the body portion;

a top part of the top taper portion has a radial dimension smaller than that of the circular recess;

the body portion has a radial dimension larger than that of the circular recess; and the base taper portion has a radial dimension gradually increasing from the body portion toward the base portion.

* * * * *